(12) United States Patent
Doyle (10) Patent No.: US 8,527,502 B2
(45) Date of Patent: Sep. 3, 2013

(54) METHOD, SYSTEM AND COMPUTER-READABLE MEDIA FOR SOFTWARE OBJECT RELATIONSHIP TRAVERSAL FOR OBJECT-RELATIONAL QUERY BINDING

(76) Inventor: Blade Makai Doyle, Morgan Hill, CA (US)

( * ) Notice: Subject to any disclaimer, the term of this patent is extended or adjusted under 35 U.S.C. 154(b) by 114 days.

(21) Appl. No.: 11/731,787

(22) Filed: Mar. 29, 2007

(65) Prior Publication Data

US 2008/0065592 A1    Mar. 13, 2008

(51) Int. Cl.
*G06F 17/30* (2006.01)
*H04L 12/58* (2006.01)

(52) U.S. Cl.
CPC ........................ *H04L 12/58* (2013.01)
USPC ........... 707/714; 707/706; 707/713; 707/793; 707/802

(58) Field of Classification Search
CPC ........................................ H04L 12/58
USPC ............. 707/1, 2, 3, 4, 100, 200, 104.1, 714, 707/736, 660, 702, 706, 713, 793, 802, 803
See application file for complete search history.

(56) References Cited

U.S. PATENT DOCUMENTS

| | | | |
|---|---|---|---|
| 5,812,996 A | 9/1998 | Rubin et al. | |
| 6,012,067 A | 1/2000 | Sarkar | |
| 6,374,252 B1 | 4/2002 | Althoff et al. | |
| 6,401,085 B1 * | 6/2002 | Gershman et al. | 707/999.003 |
| 6,453,314 B1 * | 9/2002 | Chan et al. | 707/3 |
| 6,640,221 B1 | 10/2003 | Levine et al. | |
| 6,745,198 B1 | 6/2004 | Luo et al. | |
| 6,763,350 B2 | 7/2004 | Agrawal et al. | |
| 7,162,491 B2 | 1/2007 | Ishizaka | |
| 7,171,398 B2 * | 1/2007 | Bestgen et al. | 707/2 |
| 7,275,056 B2 * | 9/2007 | Cheng et al. | 707/4 |
| 7,315,855 B2 * | 1/2008 | Carlson et al. | 707/3 |
| 7,321,888 B2 * | 1/2008 | Day et al. | 707/2 |
| 7,333,981 B2 * | 2/2008 | Dettinger et al. | 707/4 |
| 7,363,289 B2 * | 4/2008 | Chaudhuri et al. | 707/2 |
| 7,383,246 B2 * | 6/2008 | Lohman et al. | 707/2 |
| 7,461,052 B2 * | 12/2008 | Dettinger et al. | 707/3 |
| 7,664,790 B2 * | 2/2010 | Blaicher et al. | 707/999.202 |
| 7,685,194 B2 * | 3/2010 | Kabra et al. | 707/719 |
| 7,702,610 B2 * | 4/2010 | Zane et al. | 707/999.001 |
| 7,870,120 B2 * | 1/2011 | Andreev et al. | 707/713 |
| 7,908,240 B1 * | 3/2011 | Mazzagatti et al. | 1/1 |
| 2002/0059199 A1 | 5/2002 | Harvey | |
| 2002/0107836 A1 | 8/2002 | Ishizaka | |
| 2003/0110189 A1 | 6/2003 | Agrawal et al. | |
| 2004/0030741 A1 * | 2/2004 | Wolton et al. | 709/202 |
| 2004/0054683 A1 | 3/2004 | Nishizawa et al. | |
| 2004/0177084 A1 | 9/2004 | Agrawal et al. | |

(Continued)

OTHER PUBLICATIONS

Patrick T. Reilly, "Statement of Related Prior Art", authored on Jun. 30, 2009 for submittal to the USPTO, Published in Santa Cruz, CA.

*Primary Examiner* — Dangelino Gortayo
(74) *Attorney, Agent, or Firm* — Patrick Reilly (57) ABSTRACT

A system method and computer-readable media for searching an object oriented database are provided. The present invention may be employed to detect software bugs, deficiencies and/or errors in, affecting, or related to, an object database management system. The invented technique may use an SQL table join query to search for incomplete, damaged or erroneous software objects.

12 Claims, 10 Drawing Sheets

(56) References Cited

U.S. PATENT DOCUMENTS

| | | |
|---|---|---|
| 2004/0181523 A1 | 9/2004 | Jardin |
| 2004/0181524 A1 | 9/2004 | Jardin |
| 2004/0220923 A1* | 11/2004 | Nica ................................. 707/3 |
| 2005/0091199 A1* | 4/2005 | Focazio et al. .................... 707/3 |
| 2005/0091238 A1 | 4/2005 | Zane et al. |
| 2005/0097103 A1 | 5/2005 | Zane et al. |
| 2005/0120000 A1 | 6/2005 | Ziauddin et al. |
| 2005/0203869 A1 | 9/2005 | Minamino et al. |
| 2006/0179068 A1 | 8/2006 | Warner et al. |
| 2006/0212436 A1 | 9/2006 | Gupta et al. |
| 2007/0022107 A1* | 1/2007 | Yuan et al. ........................ 707/4 |
| 2007/0156736 A1* | 7/2007 | Bestgen et al. ............... 707/101 |
| 2007/0226186 A1* | 9/2007 | Ewen et al. ....................... 707/3 |
| 2008/0222087 A1* | 9/2008 | Balmin et al. .................... 707/2 |

\* cited by examiner

METHOD, SYSTEM AND COMPUTER-READABLE MEDIA FOR SOFTWARE OBJECT RELATIONSHIP TRAVERSAL FOR OBJECT-RELATIONAL QUERY BINDING

FIELD OF THE INVENTION

The present invention relates to information technology systems that maintain databases and enable searches for information contained within one or more database. The present invention more particularly relates to enabling searching of a database containing information associated in accordance with relational database and/or object oriented database design techniques.

BACKGROUND OF THE INVENTION

A database is a collection of information organized in such a way that a computer program can quickly access desired pieces of data. In its simplest form, a database is a repository for the storage and retrieval of information. Distributed database systems are databases in which the data storage and processing load is spread out over multiple database systems and connected by a communication. Distributed databases enable multiple users on a network such as a local area network (LAN) to access the same database system simultaneously. Some of the advantages made possible by prior art distributed databases include (a.) locating selected data nearer to sites of higher demand for faster and more efficient access; (b.) load balancing of computational processing and message activity among a plurality of servers; (c.) improving fault tolerance by redundantly storing data in a more than one of a variety of memory locations; and (d.) enabling scalability, wherein processing activity can be divided among multiple systems rather than upon one centralized system that must handle all requests.

Relational databases and object oriented databases are two of the most commonly used types of database types. Each database type has its advantages and inefficiencies.

An object oriented database may be modeled as a collection of objects of various arrangements of data, i.e., object classes, that can be examined, manipulated, added to, or removed. To be effective, an object oriented database system must present an interface to some service or system to a user. Such an interface may be referred to as an object model of the represented service or system. For example, the Hyper Text Mark-up Language Document Object Model is a collection of objects that represent a page in a web browser, used by script programs to examine and dynamically change the page. The Microsoft Excel object model for controlling Microsoft Excel from another program is another example of an interface for an object oriented database system. Access to data stored in software objects can be faster because joins are often not needed (as in a tabular implementation of a relational database). This is because a software object can be retrieved directly without a search, by following pointers.

In contrast to software object database structure, a relational database is organized by fields, records and tables or files. A field is a category or item of information, a record is one complete set of fields, and a table or file is a collection of records. For example, a telephone book is analogous to a table or file. It contains a list of records that is analogous to the entries of people or businesses in the phone book, each record consisting of three fields: name, address, and telephone number.

A database management system (hereafter "DBMS") can be used to access information in a database. The DBMS is a collection of programs that enables the entry, organization and selection of data in a database. There are many different types of DBMS's, ranging from small systems that run on personal computers to very large systems that run on mainframe computers or serve the data storage and retrieval needs of many computers connected to a computer network.

The set of rules or standards for constructing queries is generally referred to as a query language. Different DBMS's support different query languages, although there is a semi-standardized query language called structured query language (hereafter "SQL").

SQL is used to communicate with a database system. SQL is the American National Standards Institute standard language for relational database management systems. SQL statements are used to perform tasks such as update data on a database or retrieve data from a database. Although there are different variations or dialects of SQL, it is nevertheless the closest thing to a standard query language that currently exists. Some examples of relational database management systems that use SQL include the following: Oracle, Sybase, Microsoft SQL Server, Access, and Ingres. Although most database systems use SQL, many also have their own additional proprietary extensions that are usually only used on that system. However, the standard SQL commands such as "Select," "Insert," "Update," "Delete," "Create," and "Drop" can be used to accomplish most operations that the user needs to do with a database. Many users who are capable of authoring queries in an SQL are unfamiliar and/or uncomfortable with applying the syntax of an object oriented DBMS.

The prior art includes efforts to increase database searching effectiveness. U.S. Pat. No. 7,162,491 discloses a data processing system, data processing method and computer program; U.S. Pat. No. 6,763,350 presents a system and method for generating horizontal view for SQL queries to vertical database; U.S. Pat. No. 6,745,198 discusses a parallel spatial join index; U.S. Pat. No. 6,640,221 discloses a system and method for configuring, sequencing and viewing joins in a query; U.S. Pat. No. 6,374,252 presents a modeling of object-oriented database structures, translation to relational database structures, and dynamic searches thereon; U.S. Pat. No. 6,012,067 discloses a method and apparatus for storing and manipulating objects in a plurality of relational data managers on the web; and U.S. Pat. No. 5,812,996 discusses a database system with methods for optimizing query performance with a buffer manager. In addition, U.S. Patent Application Serial No. 20060212436 discloses rewriting queries containing rank or row number or minimum/maximum aggregate functions using a materialized view; U.S. Patent Application Serial No. 20060179068 presents techniques for efficiently storing and querying in a relational database, XML documents conforming to schemas that contain cyclic constructs; U.S. Patent Application Serial No. 20050203869 discloses a hierarchical database apparatus, components selection method in hierarchical database, and components selection program; U.S. Patent Application Serial No. 20050120000 discusses a plurality of auto-tuning SQL statements; U.S. Patent Application Serial No. 20050097103 discloses a technique of performing sequence analysis as a multipart plan storing intermediate results as a relation; U.S. Patent Application Serial No. 20050091238 presents a performance of sequence analysis as a relational join; U.S. Patent Application Serial No. 20050091199 discloses a method and system for generating SQL joins to optimize performance; U.S. Patent Application Serial No. 20040181524 discusses a system and method for distributed processing in a node environment; U.S. Patent Application Serial No. 20040181523 discloses a system and method for generating and processing results data in a distributed system; U.S. Patent Application Serial No. 20040177084 presents a system and method for generating horizontal view for SQL queries to vertical database; U.S. Patent Application Serial No. 20040054683 discloses a system and method for join operations of a star schema database; U.S. Patent Application Serial No. 20030110189 discusses a system and method for generating horizontal view for SQL queries to vertical database; U.S. Patent Application Serial No. 20020107836 discloses a data processing system, data processing method and computer program; and U.S. Patent Application Serial No. 20020059199 presents a system for and method of operating a database.

The entire disclosures of each and every patent and patent application mentioned in this present disclosure, to include U.S. Pat. Nos. 7,162,491; 6,763,350; 6,745,198; 6,640,221; 6,374,252; 6,012,067; and 5,812,996, as well as US Patent Application Serial No.'s 20060212436; 20060179068; 20050203869; 20050091238 presents a performance of sequence analysis as a relational join; 20050091199; 20040181524; 20040181523; 20040177084; 20040054683; 20030110189; 20020107836; and 20020059199 as noted above, are incorporated herein by reference, in their entirety, and for all purposes.

There exists, therefore, a long felt need to provide a DBMS that takes advantage of the search speed advantages of object oriented database technology while allowing users familiar with SQL the opportunity to search the database by authoring SQL-like queries.

SUMMARY OF THE INVENTION

Towards this object and other objects that will be made obvious in light of this disclosure, a first version of the method of the present invention provide a system, method and computer-readable media for searching a database for related information.

A first preferred embodiment of the method of the present invention provides a performance enhancement for searching a data base containing software objects by taking advantage of information indicating an existing objectivity relationship contained within, or associated with, another existing software object. By using stored relationship information the associated software object can be accessed directly and efficiently.

Certain alternate preferred embodiments of the method of the present invention may be apply a join table query operation to identify software objects that lack a reference to another software object, whereby the identification process of these software objects lacking a reference to other software objects can be used to detect software bugs, deficiencies and/or errors in, or affecting, an object database management system. The table join operation may be an outer join of two tables.

In certain other alternate preferred embodiments of the method of present invention an object-oriented database may be searched by queries formatted substantively according to a syntax of a structured query language (hereafter "SQL") to direct a data base system to perform a table join.

Certain still alternate preferred embodiments of the method of the present invention contain on or more of the following aspects:

1. automatically identifying cases which allow use of a relationships defined in the database schema to perform a table join;

2. traversing a query tree by searching for join nodes which meet the following criteria:
   a. a join operator being an equivalency operator;
   b. relating two child nodes that are each projection nodes;
   c. identifying two grandchild nodes that are table scan nodes; and
   d. processing a join formed across an object-to-object association.
   e. performing a table join at least partially by traversing object-to-object associations directly to find a related object;
   f. determining which object referenced in the join table is a 'near' object and which object referenced in the join table is the 'far' object, wherein the near object contains a reference, e.g., a pointer, to the far object;
   g. for one or more tuples in a table referencing near objects
      i. fetch the next 'near' object by advancing the iterator.
      ii. extract the reference of the far object from the near object, wherein the reference may be an object identification (hereafter "OID");
      iii. use that OID to retrieve the referenced far object; and
      iv. extract and return requested data from the near and/or far node(s).

A data base system operating in accordance with the method of the present invention can, in certain scenarios and embodiments, traverse pre-existing relationships between data structures, e.g., software objects, to more directly access matching tuples, data structures or software objects. In other words, by using relationships embedded in or associated with data structures prior to a search, the data base system can, in certain applications and embodiments, avoid or reduce scanning a second table, wherein the second table specifies or references software objects or other data structures.

In contrast, certain prior art techniques perform a table join using a nested loop algorithm in which each software object must be retrieved and the values of each tuple, e.g., software objects, of one table must be compared with each tuple, e.g., software objects, of another table resulting in up to N*N compares for tables with N tuples. In some cases the prior art nested loop join is optimized using indexes, but these prior art techniques impose computational overhead in storing and maintaining indexes.

Certain yet alternate preferred embodiments of the method of the present invention take advantage of object-relationships automatically whenever possible and does not always require that a user write or generate an SQL query in a highly formatted or narrowly syntactical way. Because special syntax may not be required to apply these embodiments of the present invention, a less sophisticated users can take advantage of object-to-object relationships even though the user has no or limited specific knowledge of object oriented data base software.

Various still other alternate preferred embodiments of the method of the present invention provide a computer system and/or computer-readable medium that direct the computer system to execute or instantiate on or more aspects of the method of the present invention disclosed herein.

The foregoing and other objects, features and advantages will be apparent from the following description of the preferred embodiment of the invention as illustrated in the accompanying drawings.

BRIEF DESCRIPTION OF THE DRAWINGS

These, and further features of the invention, may be better understood with reference to the accompanying specification and drawings depicting the preferred embodiment, in which.

DETAILED DESCRIPTION OF A PREFERRED EMBODIMENT

In describing the preferred embodiments, certain terminology will be utilized for the sake of clarity. Such terminology is intended to encompass the recited embodiment, as well as all technical equivalents, which operate in a similar manner for a similar purpose to achieve a similar result.

Figure 1:
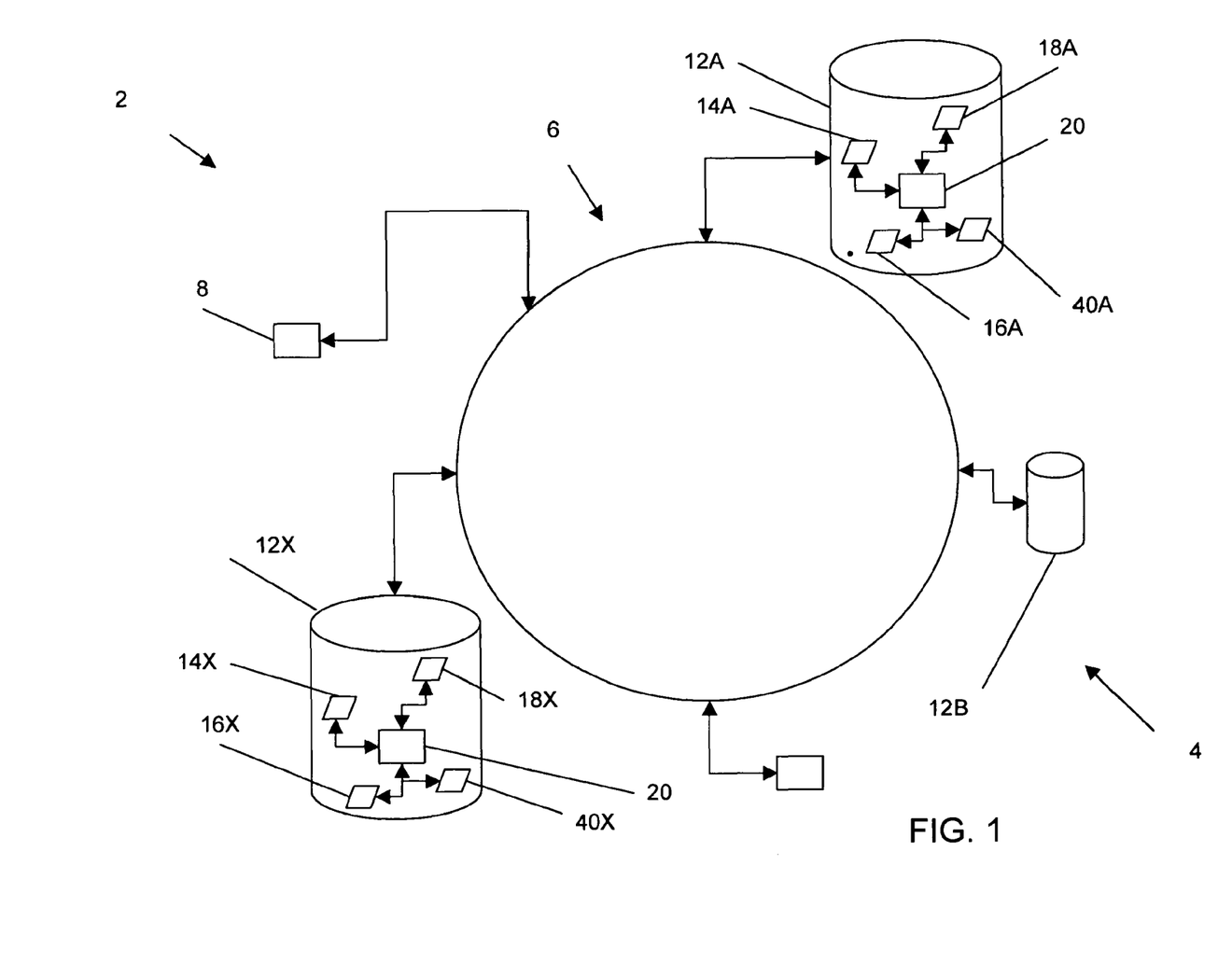
FIG. 1 is a schematic diagram of an information technology infrastructure that supports a federated database.

Referring now generally to the Figures and particularly to FIG. 1, FIG. 1 is a schematic diagram of an information technology infrastructure 2 that supports a federated database 4. The information technology infrastructure 2 (hereafter "IT network" 2) includes an electronic communications network 6, a user computer system 8, an administration computer system 10, and a plurality of database equipment 12A-12X, i.e. database servers 12A-12X. It is understood that the IT network 2 and the federated database 4 may wholly or partially comprise, or be comprised within, the Internet.

The user computer system 8, or query system 8, transmits queries to the database servers 12A-12X via the communications network 6. Each database server 12A-12X is configured to maintain and search at least one local database 14A-14X of the federated database 4, and each database server 12A-12X further comprises at least one local interactive SQL interface 16A-16X. One or more local database 14A-14X may associate one or more pluralities of data structures into containers, wherein each container comprises a subset of the data structures, e.g., software objects, of a local database 14A-14X.

As described below in particular reference to FIG. 5, one or more database servers 12A-12X may each further comprise a configurable object-relational database mapping system 18A-18X (hereafter "OBJ/REL mapping system" 18A-18X), wherein the OBJ/REL mapping systems 18A-18X may apply parameters according rules that may affect the communication of search findings from one or more data base servers 12A-12X to the query system 8.

Figure 2:
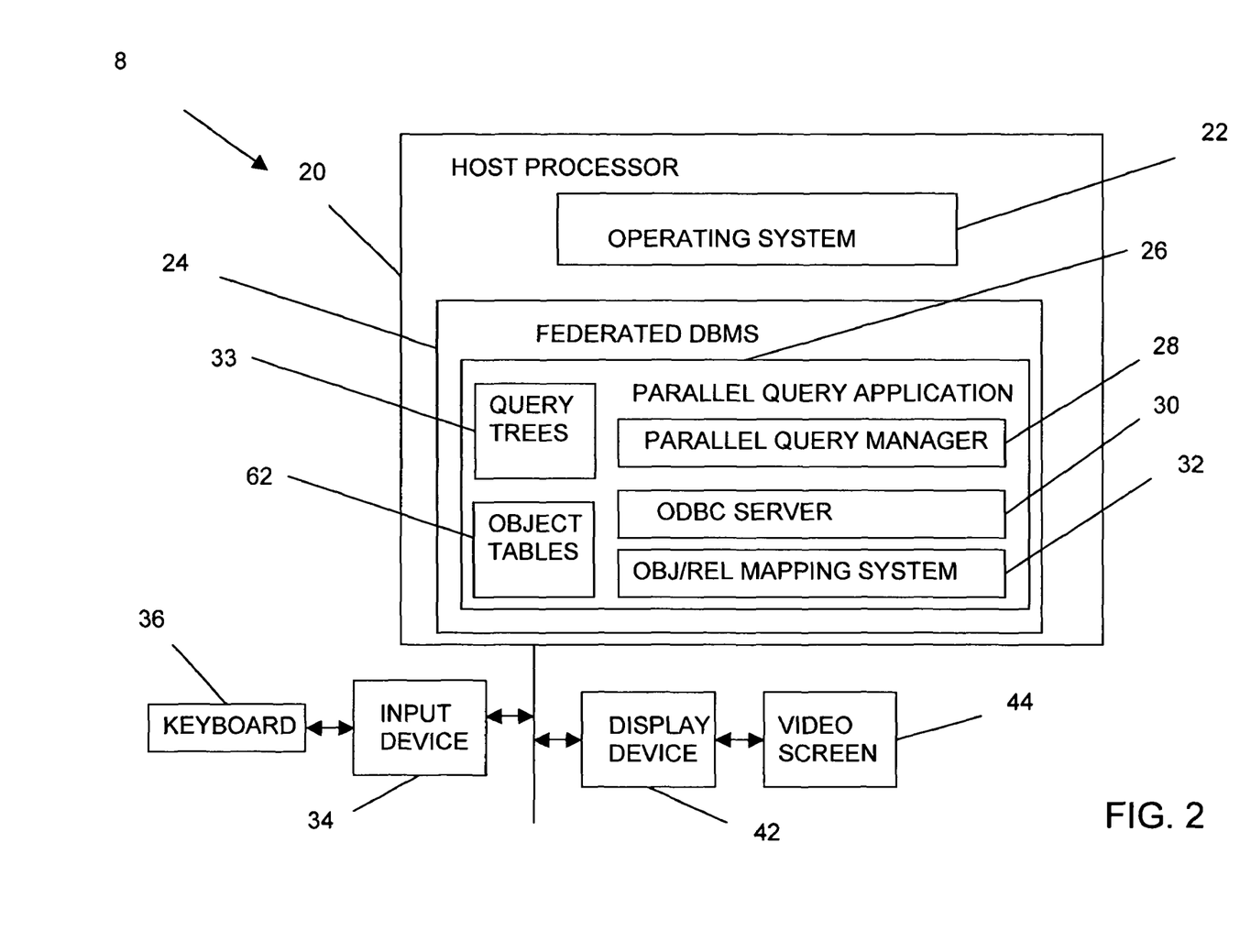
FIG. 2 is a block diagram of a user computer system of the information technology infrastructure of FIG. 1 that enables a searching technique in accordance with a first alternate preferred method of the present invention.
Figure 7:
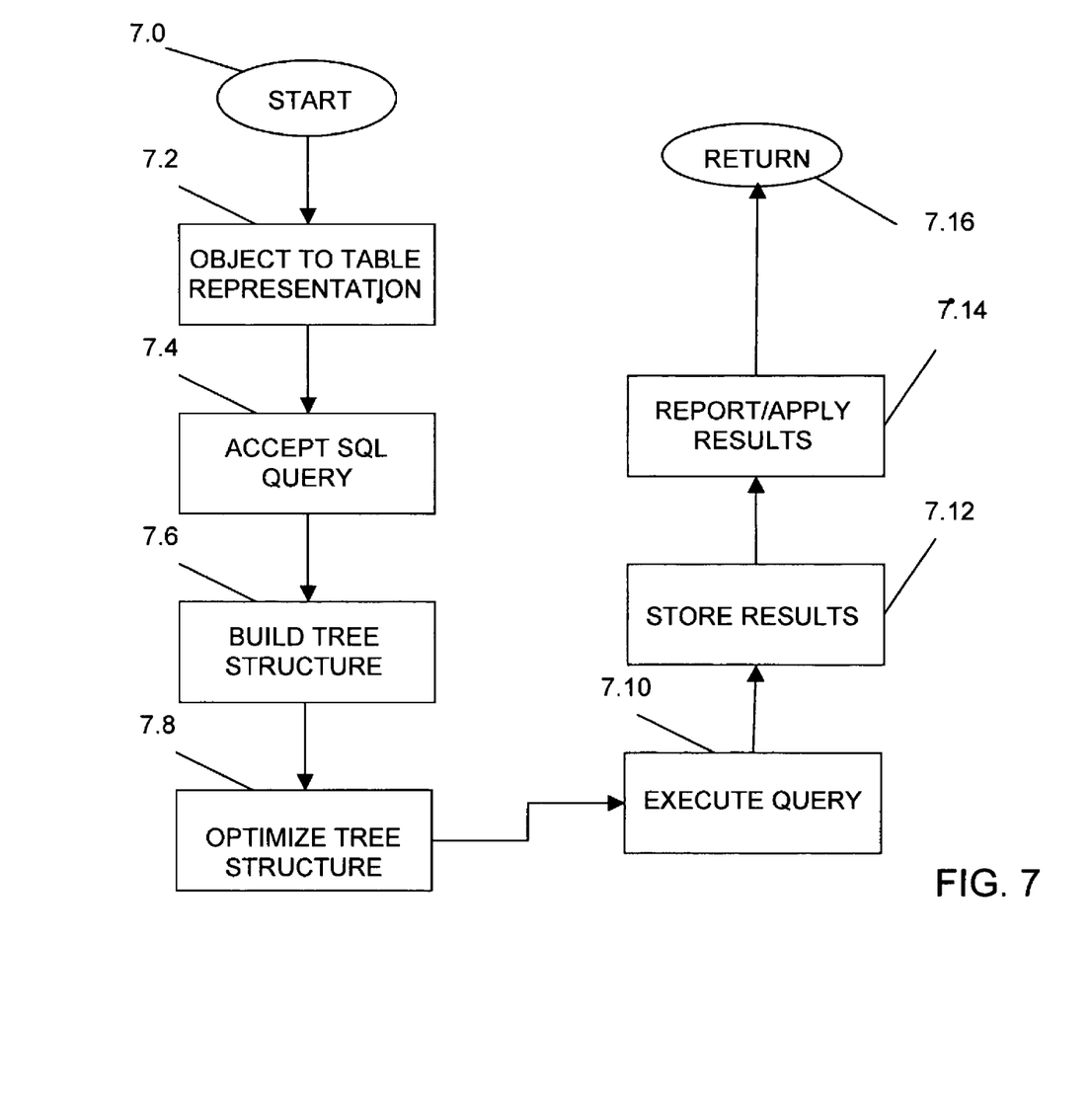
FIG. 7 is a flowchart of an alternate query process that may be executed in accordance with the method of the present invention and by means of the network of FIG. 1, the DBMS of FIG. 2 and/or the local the DBMS of FIG. 3.
Figure 8:
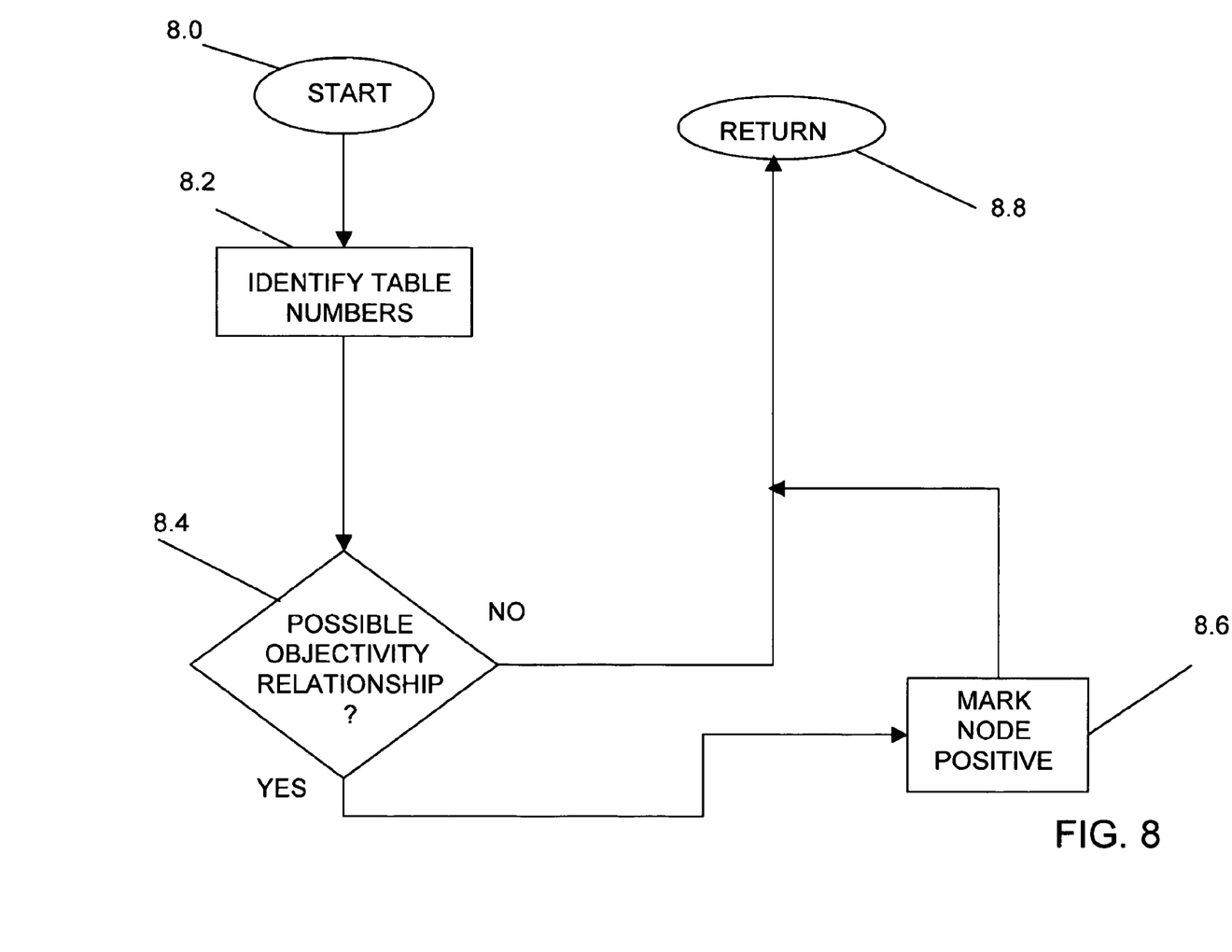
FIG. 8 is a flow chart of an optimization process of a query tree of FIG. 2 and built within the process of the flowchart of FIG. 7.
Figure 9:
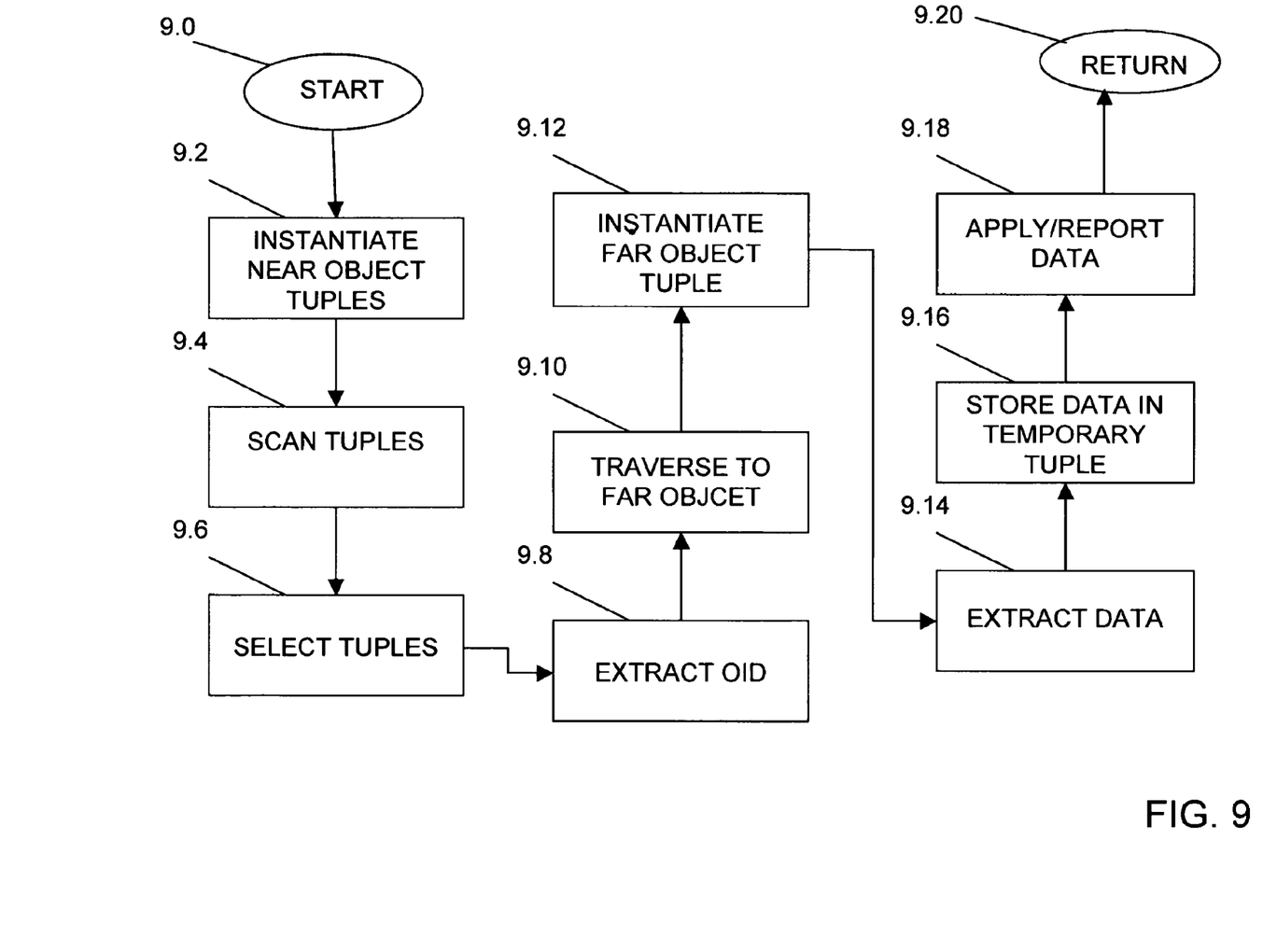
FIG. 9 is a flowchart of a still alternate query process that may be executed in accordance with the method of the present invention and by means of the network of FIG. 1, the DBMS of FIG. 2 and/or the local the DBMS of FIG. 3.

Referring now generally to the Figures and particularly to FIG. 2, FIG. 2 is a block diagram of the query system 8 of the IT network 2 of FIG. 1. The query system 8 may comprise, or be comprised within, (1.) a personal computer configured for running WINDOWS XP™ operating system marketed by Microsoft Corporation of Redmond, Wash., (2.) a computer workstation configured to run, and running, a LINUX or UNIX operating system, or (3.) other suitable computational system known in the art. The query system 8 includes hardware elements and software components that enable a searching technique in accordance with the first alternate preferred method of the present invention (hereafter "first method"). A host processor 20 of the query system 8 stores an operating system 22, a federated DBMS 24 including a parallel query application 26. The parallel query application 26 includes a client parallel query manager 28, an Open Data Base Connectivity server 30 (hereafter "ODBC server" 30), an object-relational database mapping system 32, and one or more query trees 33. The client query manager 28 accepts input from a user via an input device 34, e.g., an electronic computer peripheral keyboard 36, and generates a query statement Q therefrom, as described below in reference to FIG. 7. The query statement Q is provided to the ODBC server 30 by the host processor 20. The ODBC server 30 assigns the query statement Q to a plurality of search agents 16A-16X of the database servers 12A-12X, and in accordance with a set of rules applied by a user configurable task splitter 38 of the ODBC server 30. The ODBC server 30 then provides the query statement Q to the client query manager 28, wherefrom the query statement Q is communicated to the plurality of database servers 12A-12X via the communications network 6. Findings communicated from the database servers 12A-12X sent in response to the receipt and processing of the query statement Q are communicated from the data base servers 12A-12X via the communications network 6 to the object-relational database mapping system 32 of the host processor 20.

The DBMS 24 may be, or comprise, or be comprised within, a federated database that might include in singularity or combination (1.) an object oriented database as marketed by Objectivity, Inc., of Sunnyvale, Calif.; (2.) an IBM DB2 Universal Database™ server (in Linux, UNIX®) marketed by IBM Corporation of Armonk, N.Y.; (3.) WINDOWS™ operating system environments marketed by Microsoft Corporation of Redmond, Wash.; and/or (4.) multiple data sources to which the client query application sends queries.

It is understood that the administration computer system 10, and the plurality of database servers 12A-12X may comprise a host processor 20 that (a.) does not include the federated DBMS 24 nor the parallel query application 26, and (b.) is bi-directionally communicatively coupled with the electronic communications network 6. It is further understood that in yet other alternate preferred embodiments of the method of the present invention the steps disclosed herein could be directly or indirectly invoked by communication with an application program on behalf of one or more other computer programs running on a computational system and without human interaction.

Figure 3:
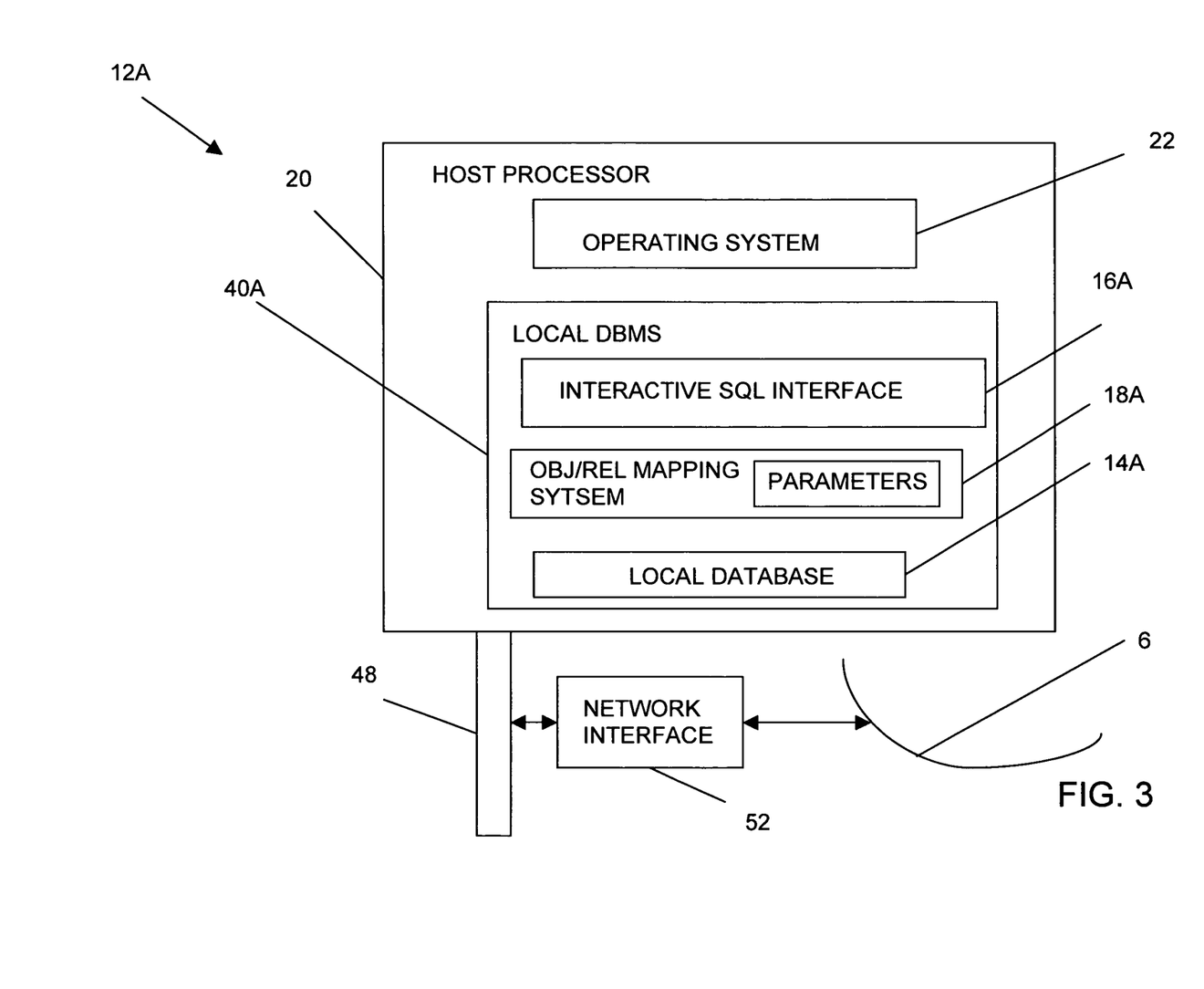
FIG. 3 is a block diagram of a server of the information technology infrastructure of FIG. 1 that enables a searching technique in accordance with a first alternate preferred method of the present invention.

FIG. 3 is a block diagram of a database server 12A-12X of the IT network 2 of FIG. 1 that enables the searching technique in accordance with a first alternate preferred method of the present invention. One or more database servers 12A-12X may comprise, or be comprised within, (1.) a SOLARIS SPARCSERVER computer workstation marketed by Sun Microsystems of Santa Clara, Calif. running LINUX or UNIX operating system, (2.) other suitable computational system configured to run, and running, a LINUX or UNIX operating system, or (3.) other suitable computational system known in the art.

Each database server 12A-12X includes hardware elements and software components that enable a searching technique in accordance with the first method. A host processor 20 of each database server 12A-12X stores an operating system 22, a local DBMS 40A-40X including a local database 14A-14X, a local interactive SQL interface 16A-16X, and a local software OBJ/REL mapping system 18A-18X. Each OBJ/REL mapping system 18A-18X contains a set of local object database to relational database mapping parameters applied by the local software OBJ/REL mapping system 18A-18X to inhibit communication of data structures of the local database 14A-14X. Those data structures that are selected as matching the ranges and predicates of the query statement Q in a search of the local database 14A-14X performed by the local interactive SQL interface 16A-16X, and that are not inhibited from communication to the query system 8 by the OBJ/REL mapping system 18A-18X, are communicated via the communications network 6 to the distributed shared queue of the query system 8.

Figure 4:
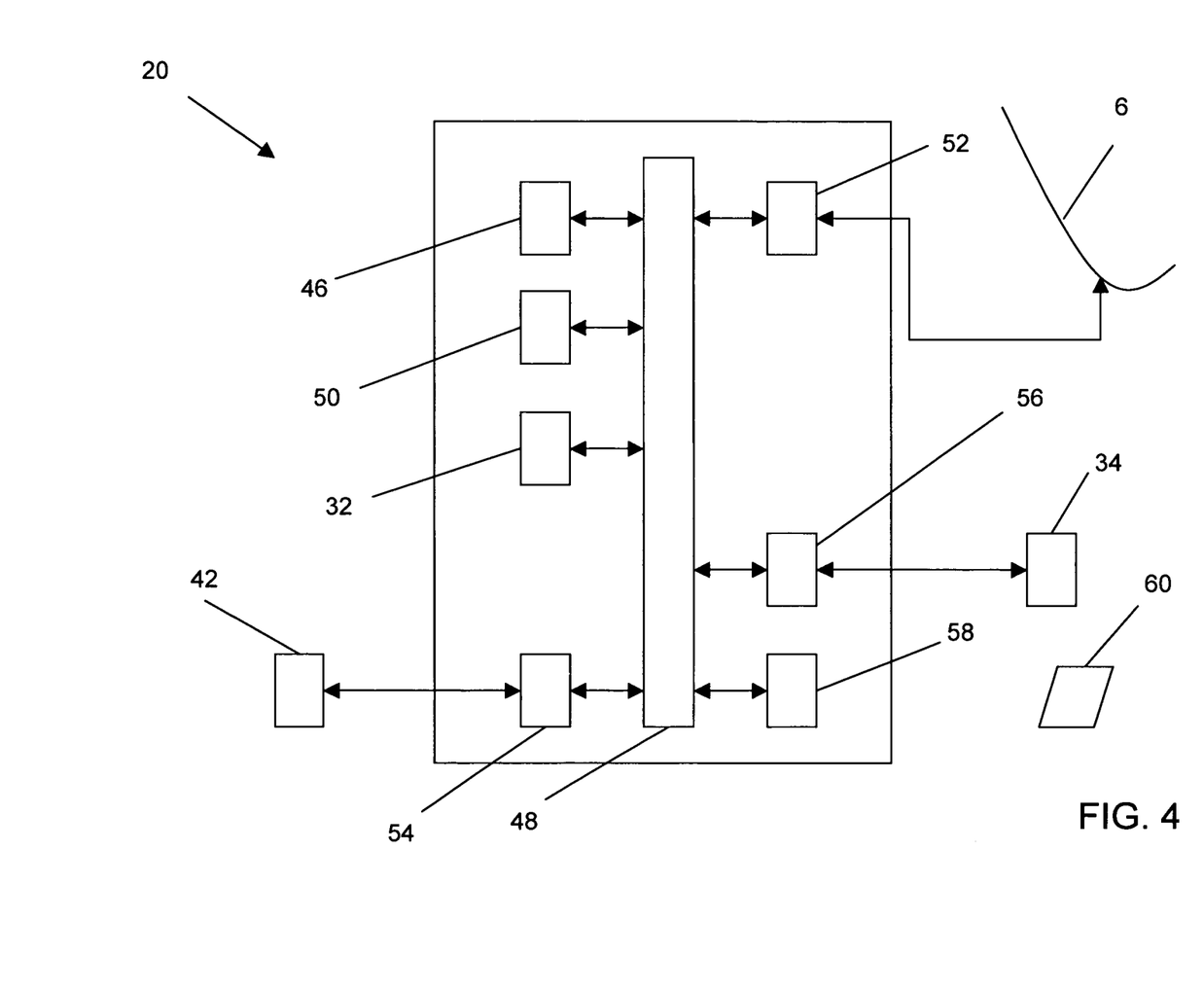
FIG. 4 is a schematic diagram of the host processor of FIG. 2.

Referring now generally to the Figures and particularly to FIGS. 2 and 4, FIG. 4 is a schematic diagram of the host processor 20 of the query system 8, the servers 12A-12X, and the administration computer system 10. The host processor 20 includes a central processing unit 46, an internal communications bus 48, a system memory 50, a network interface 52, a video device interface 54, an input device interface 56, and an electronic media reader 58. The central processing unit 46 may be or comprise a PENTIUM™ microprocessor or other suitable processing unit known in the art. The internal communications bus 48 bi-directionally communicatively couples the central processing unit 46, the system memory 50, the network interface 52, the video device interface 54, the input device interface 56, and the electronic media reader 58. The system memory 50 may store both data structures and executable software programs, and make the stored data structures and software executable programs to the central processing unit 46 via the internal communications bus 48. Where the host processor 20 is installed in a database server 12A-12X, the system memory 50 stored one or more databases 14A-14X and a DBMS 40. The DBMS 40 of each database server is configured to apply an interactive SQL interface 16A-16X, and optionally a configurable software OBJ/REL mapping system 18A-18X, to one or more databases 14A-14X stored in the system memory 50.

The network interface 52 is bi-directionally communicatively coupled with the electronics communications network 6 and enables the communications of query statements Q and search findings between the query system 8 and the database servers 12A-12X.

The video device interface 54 is bi-directionally communicatively coupled with the display device 42 and enables the visual presentation of information, to include findings from database searches, to be visually presented to a user via the video screen 44.

The input device interface 56 is communicatively coupled with the input device 34 and enables the user to input query requests and otherwise interact with the host processor 20.

The electronic media reader 58 is configured to read machine-executable instructions from a computer-readable medium 60, wherein the machine-executable instructions direct the host processor to perform one or more of the steps of the method of the present invention.

One or more interactive SQL interface 16A-16X or search agent OBJ/REL mapping system 18A-18X may be user provided by means of inputting the interactive SQL interface 16A-16X or OBJ/REL mapping system 18A-18X to a database server 12A-12X via the IT network 2, the query system 8, and/or the computer-readable medium 60 in combination or as a sole source of machine-executable software code.

The terms "computer-readable medium" and "computer-readable media" as used herein refer to any suitable medium known in the art that participates in providing instructions to the IT network 2, the communications network 6, the query system 8, the administration computer system 10, and/or one or more database servers 12A-12X for execution. Such a medium may take many forms, including but not limited to, non-volatile media and volatile media. Non-volatile media includes, for example, optical or magnetic disks, such as may be comprised within the system memory 50.

Volatile media includes dynamic memory.

Common forms of computer-readable media 60 include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, any other medium from which a computer system 8, 10, 12A-12X can read.

Various forms of computer readable media 60 may be involved in carrying one or more sequences of one or more instructions to the network for execution. For example, the instructions may initially be carried on a magnetic disk of a remote server 12A-12X. The remote server 12A-12X can load the instructions into its dynamic memory and send the instructions over a telephone line using a modem. A modem local to or communicatively linked with the IT network 2 can receive the data on the telephone line and use an infra-red transmitter to convert the data to an infra-red signal. An infrared detector can receive the data carried in the infrared signal and appropriate circuitry can provide the data to the IT network 2.

Figure 5:
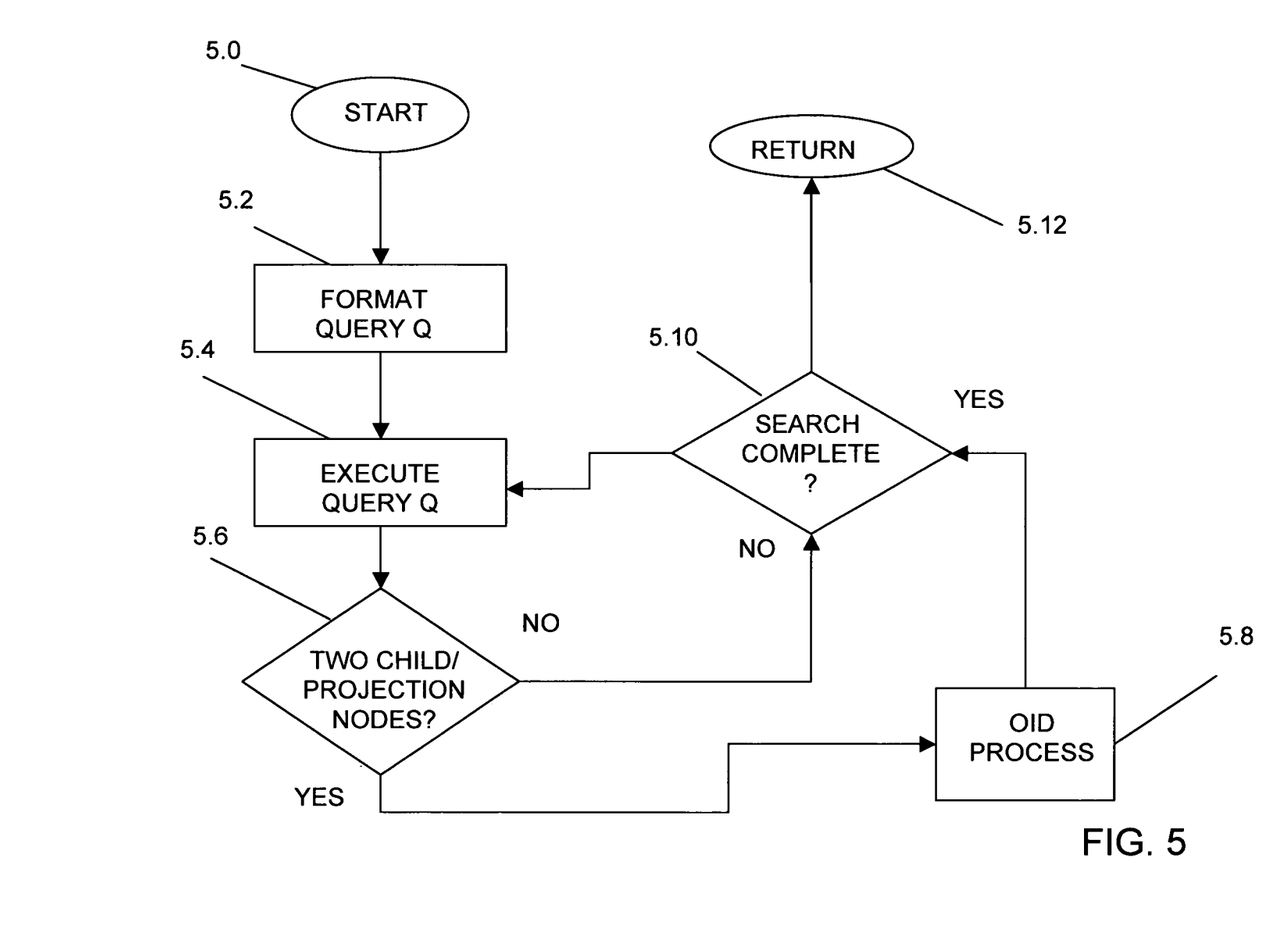
FIG. 5 is a flowchart of a first alternate preferred embodiment of the method of the present invention that may be implemented by the information technology infrastructure of FIG. 1.

Referring now generally to the Figures and particularly to FIGS. 1, and 5, FIG. 5 is a flowchart of a first preferred alternate preferred embodiment of the method of the present invention. In step 5.2 query Q is formatted substantively in accordance with an SQL syntax. In step 5.4 the query Q is applied to and executed within a local, distributed, and or federated database by the DBMS 24. In step 5.6 the DBMS 24 determines whether two child nodes, both child nodes being projection nodes, have been detected as associated in the process of the execution of the query Q. Where such pair of associated child-projection nodes are detected by the DBMS 24, the DBMS 24 proceeds on to execute step 5.8 and apply an object identification found in a query tree node's near node to harvest and report data stored in a far node of the same query tree node. One version of the OID process of step 5.8 is presented in FIG. 6. It is understood that one or more query tree nodes may be associated with a paired near node and far node, wherein (1.) each near node of the node pair associates near objects with the query tree 33 and each far node of the node pair associates far objects with the query tree 33.

Alternatively, the DBMS 24 may proceed from step 5.6 to step 5.10. The DBMS 24 determines in step 5.10 whether the execution of the query Q has been completed, and if the query Q execution has been completed, the DBMS 24 proceeds on to step 5.12 to return to or enable alternate processes. Alternatively, the DBMS 24 may proceed from step 5.10 to continue an incomplete execution of the query Q.

Figure 6:
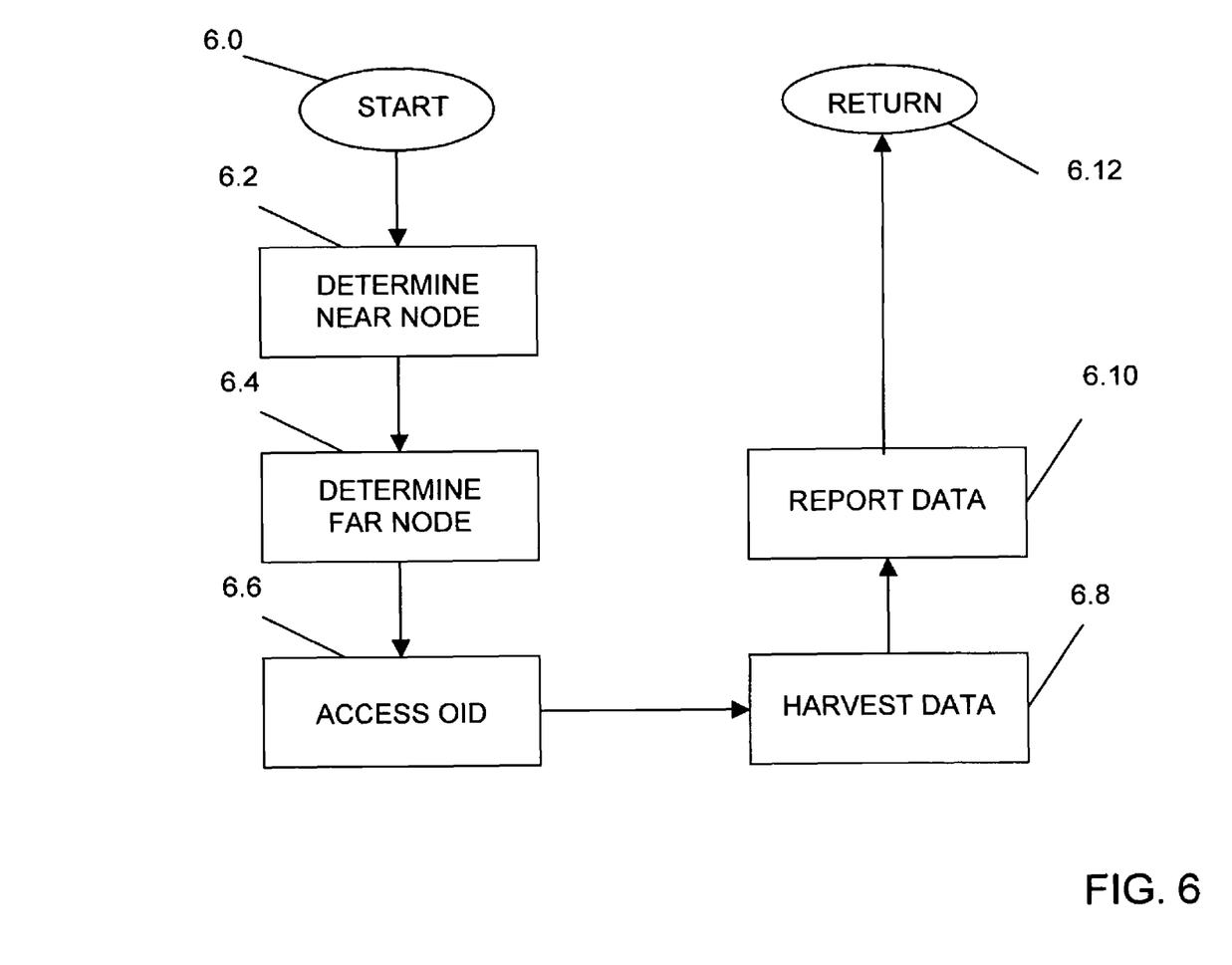
FIG. 6 is a flowchart of an OID process included within the process of FIG. 5.

Referring now generally to the Figures and particularly to FIGS. 1, 5 and 6, FIG. 6 is a flowchart of an OID process of step 5.8 of the process of FIG. 5. When the DBMS 24 proceeds from step 5.6 to step 5.8, the DBMS 24 determines in step 6.2 which of the child nodes identified in step 5.6 is a near object. The DBMS 24 further determines in step 6.4 which of the child nodes identified in step 5.6 is a far node. In step 6.6 the OID stored in the far node is accessed by the DBMS 24. In step 6.8 data of the far node referenced by the OID of the near object is harvested. In step 6.10 the data harvested in step 6.8 is reported via the DBMS 24 to an addressee of the results of the query Q. In step 6.12 the DBMS 24 returns to step 5.10 of the process of FIG. 5.

Referring now generally to the Figures and particularly to FIGS. 1, 2, 3, 5 and 7, FIG. 7 is a flowchart of an alternate query process that may be executed in accordance with the method of the present invention. The DBMS 24 and/or one or more local DBMS's 40A-40X may collaboratively or in singularity execute one or more of the aspects or steps of the flowchart of FIG. 7. In step 7.2 two or more tabular representations, or object tables 62, derived from a plurality of software objects is formed and stored in the DBMS 24, 40A-X (as per FIG. 2). Each tabular representation of a software object of a table 62 may include (1.) an OID of the instant software object from which the tabular representation is derived, (2.) a type number of the same software object, (3.), one or more attributes of the same software object, and (4.) one or more pointers to, or OID's of, other software objects. In step 7.2 an outer join query is accepted by the DBMS 24, 40A-40-X. In step 7.6 a query tree 33 is built according to suitable prior art techniques. In step 7.8 the query tree 33 built in step 7.6 is optimized in accordance with the method of the present invention. In step 7.10 the query accepted in step 7.4 is executed in relation with the query tree 33 as optimized in step 7.8. In optional step 7.12 some or all of the results of the query execution of step 7.10 are stored, and in step 7.14 some or all of the results of the query execution of step 7.10 are (a.) reported to one or more users by means of the network 2 and/or a display device 42, and/or (b.) applied within or to an additional information processing step.

Referring now generally to the Figures and particularly to FIGS. 1, 2, 3, 6 and 7, FIG. 8 is a flow chart of an optimization process of the query tree 33 built in process step 7.6. The DBMS 24 40A-40X may move from step 7.6 to step 8.0. In step 8.2 the table numbers of each software object stored in the object table 62 of step 7.2 and the comprised within the query tree 33 built in step 7.6 are identified. In step 8.4 each software object of the object table 62 is examined to determine whether an objectivity relationship relating to the outer join query might exist between an individual software object and another software object. In one exemplary application of step 8.4, some or all nodes of the query tree built in step 7.6 that associates a near object with a far object are examined to determine whether the instant near object is structured to contain an OID to the instant far node. In step 8.6 the query tree nodes found in step 8.4 to identify nodes pairs of object type numbers have an objectivity relationship are noted by the DBMS 24, 40A-40X as having objectivity relationships relevant to the query accepted in step 7.4. In step 8.8 the DBMS 24, 40A-40X returns to step 7.8 to continue optimizing the query tree 33 or 7.10 to execute the query.

Referring now generally to the Figures and particularly to FIGS. 1, 2, 3, 5 and 7, FIG. 9 is a flowchart of a still alternate query process that may be executed in accordance with the method of the present invention. In step 9.2 tuples of near objects of a node of the query tree 33 are instantiated. In step 9.4 the near object tuples instantiated in step 9.2 are scanned to determine which, if any, instantiated tuples present an objectivity relationship with a far object that is relevant to the table join query being processed by the DBMS 24, 40A-X. In step 9.6 tuples of near objects presenting a relevant objectivity relationship are selected. In step 9.8 the OID's far objects stored in the far node tuples selected in step p,6 are extracted. In step 9.10 the DBMS 24, 40A-40X traverses to the far nodes referenced by the OID's extracted in step 9.8. In step 9.12 the far object tuples traversed to in step 9.10 are instantiated as far object tuples. In step 9.14 data is extracted from the far node tuples instantiated in step 9.12. In optional step 9.16 the data extracted in step 9.14 is stored within one or more DBMS 24, 40A-X. In step 9.18 the some or all of the data extracted in step 9.14 may be (a.) reported to one or more users by means of the network 2 and/or a display device 42, and/or (b.) applied within or to an additional information processing step.

Referring now generally to the Figures and particularly to FIGS. 2, 3, 4, 9 and 10, FIG. 10 is a flowchart of a yet alternate query process that may be executed in accordance with the method of the present invention. The DBMS 24, 40A-X may optionally proceed from step 9.4 or step 9.6 to step 10.0 In step 10.2 OID attributes of instantiated near object tuples are examined. In step 10.4 the DBMS 24, 40A-X determines whether an OID is located in each instantiated near object tuple. In step 10.6 near object tuples not presenting OID's of a far object are (a.) reported to one or more users by means of the network 2 and/or a display device 42, and/or (b.) applied within or to an additional information processing step.

Figure 10:
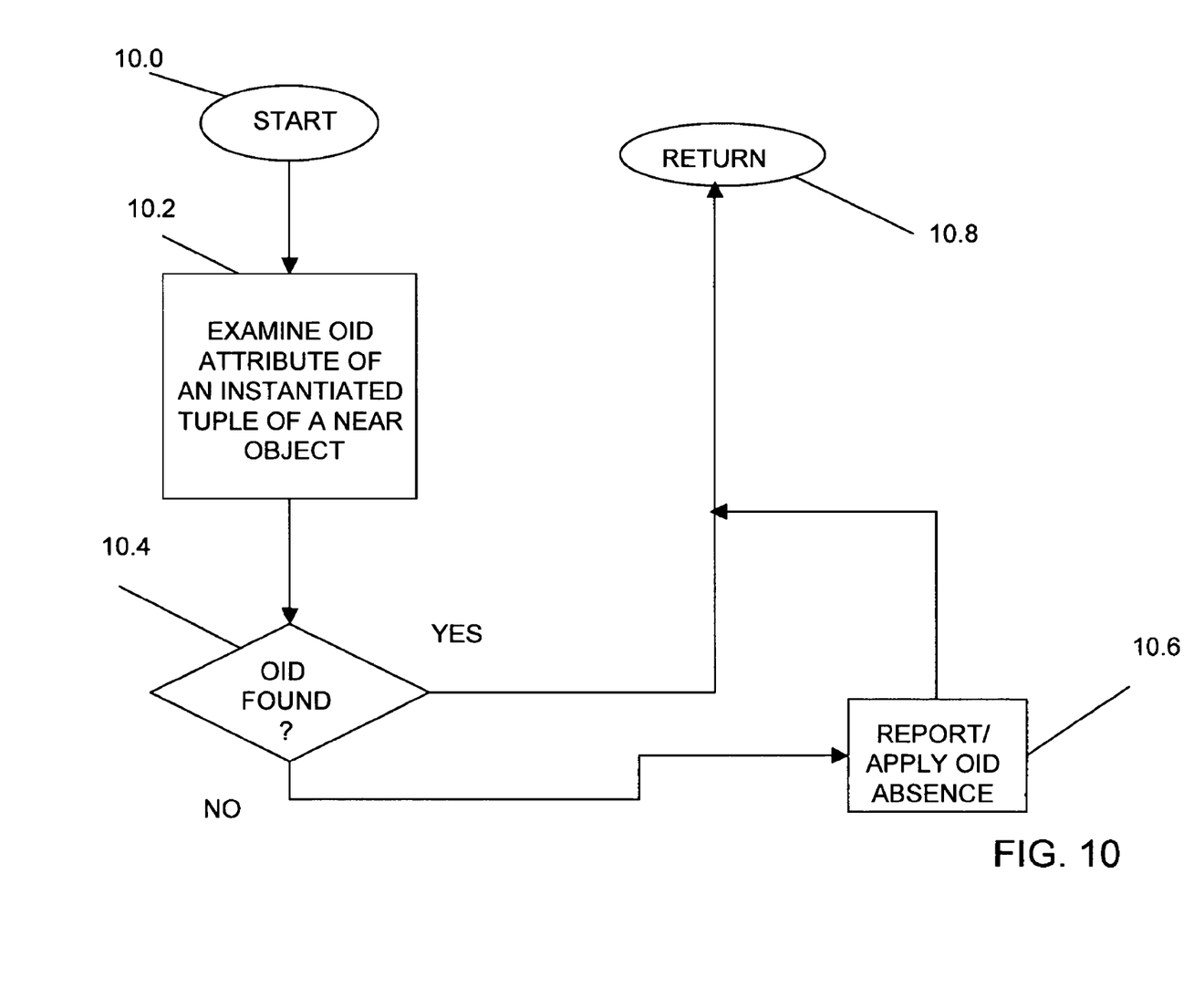
FIG. 10 is a flowchart of a yet alternate query process that may be executed in accordance with the method of the present invention and integrated within the process of FIG. 9.

The process of FIG. 10 may be applied to identify software objects that lack an OID reference to another software object, whereby the identification of these software objects lacking OID's to other software objects can be used to detect software bugs, deficiencies and/or errors in, affecting, or related to, an object database management system.

The foregoing disclosures and statements are illustrative only of the Present Invention, and are not intended to limit or define the scope of the present invention. The above description is intended to be illustrative, and not restrictive. Although the examples given include many specificities, they are intended as illustrative of only certain possible embodiments of the Present Invention. The examples given should only be interpreted as illustrations of some of the preferred embodiments of the present invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

I claim:

1. In an information technology system having an input device, an output device, an object oriented software data base ("data base"), a method instantiated during a query execution, the method comprising:
 a. Receiving a query string from a user via the input device;
 b. Forming a query tree;
 c. Selecting an equivalence join node of the query tree having at least two child nodes wherein both child nodes are projection node software objects;
 d. Designating a near node from the two child nodes;
 e. Designating a far node from the two child nodes;

f. Instantiating a near tuple of the near node;

g. Reading a far object identification ("the far OID") of the far node as referenced by the near node;

h. Detecting an anomaly associated with the far OID; and i. Informing the user via the output device of a descriptive quality of the detected anomaly associated with the far OID when the near tuple fails to reference the far node, wherein a failure of reference of the near node to the far node is determined and reported to a user at the instance of a query process.

2. The method of claim 1, wherein the anomaly comprises an out of range attribute value of a second software object associated with the far node.

3. The method of claim 1, wherein the anomaly comprises an invalid object type.

4. The method of claim 1, wherein the data base comprises software objects and relational data base structures.

5. The method of claim 1, wherein the query string is formatted in accordance with a structured query language query syntax.

6. The method of claim 1, wherein the far OID is a null value.

7. The method of claim 1, wherein the input device is bi-directionally communicatively coupled with the software data base via an electronic communications network.

8. The method of claim 1, further comprising the anomaly indicating an invalidity of the far OID.

9. The method of claim 1, further comprising the anomaly indicating an invalidity of a datum associated with the far OID.

10. The method of claim 1, further comprising the information technology system deleting the far OID reference from an object corresponding to the near node.

11. The method of claim 1, further comprising reporting data extracted from the far object via the output device in accordance with a structured query language syntax.

12. A tangible non-transitory computer-readable media comprising machine-readable instructions that direct a computational system to execute the method of:

a. Receiving a query string from a user via the input device;

b. Forming a query tree;

c. Selecting an equivalence join node of the query tree having at least two child nodes wherein both child nodes are projection node software objects;

d. Designating a near node from the two child nodes;

e. Designating a far node from the two child nodes;

f. Instantiating a near tuple of the near node;

g. Reading an object identification ("OID") of the far node;

h. Searching the near tuple for the presence of the OID of the far node; and i. Informing the user via the output device of a descriptive quality of the detected anomaly associated with the far OID when the near tuple fails to reference the far node, wherein a failure of reference of the near node to the far node is determined and reported to a user at the instance of a query process.

* * * * *